United States Patent
Raviv et al.

(10) Patent No.: US 11,861,652 B2
(45) Date of Patent: Jan. 2, 2024

(54) METHOD AND SYSTEM FOR MAILBOX-BASED COUPON DISPLAY

(71) Applicant: Oath Inc., New York, NY (US)

(72) Inventors: Ariel Raviv, Haifa (IL); Ran Wolff, Geva-Carmel (IL); Joel Oren, Tel Aviv (IL); Noa Avigdor-Elgrabli, Haifa (IL); Michael Viderman, Haifa (IL); Ian Michael McCarthy, Menlo Park, CA (US)

(73) Assignee: Yahoo Ad Tech LLC, New York, NY (US)

( * ) Notice: Subject to any disclaimer, the term of this patent is extended or adjusted under 35 U.S.C. 154(b) by 120 days.

(21) Appl. No.: 16/235,077

(22) Filed: Dec. 28, 2018

(65) Prior Publication Data

US 2020/0211048 A1    Jul. 2, 2020

(51) Int. Cl.
*G06Q 30/02* (2023.01)
*G06Q 30/0207* (2023.01)
*G06N 20/00* (2019.01)
*G06Q 30/0251* (2023.01)

(52) U.S. Cl.
CPC ......... *G06Q 30/0239* (2013.01); *G06N 20/00* (2019.01); *G06Q 30/0261* (2013.01); *G06Q 30/0269* (2013.01)

(58) Field of Classification Search
CPC ........................... G06Q 30/0239; G06N 20/00
See application file for complete search history.

(56) References Cited

U.S. PATENT DOCUMENTS

| | | | | |
|---|---|---|---|---|
| 9,384,502 | B2 * | 7/2016 | Guo | G06Q 10/107 |
| 10,116,608 | B2 * | 10/2018 | Jones | H04L 67/02 |
| 10,929,889 | B1 * | 2/2021 | Aggarwal | G06Q 30/0269 |
| 2002/0188689 | A1 * | 12/2002 | Michael | G06Q 10/107 |
| | | | | 709/224 |
| 2009/0313101 | A1 * | 12/2009 | McKenna | G06Q 30/0224 |
| | | | | 705/30 |
| 2011/0231233 | A1 * | 9/2011 | Iannace | H04L 67/18 |
| | | | | 705/14.13 |
| 2013/0054354 | A1 * | 2/2013 | Kunz | G06Q 10/107 |
| | | | | 705/14.72 |

(Continued)

OTHER PUBLICATIONS

Blanco, Ranking of daily deals with concept expansion, Mar. 10, 2015, Elsevier, p. 362, https://www.sciencedirect.com/science/article/pii/S0306457315000047 (Year: 2015).*

*Primary Examiner* — Eric R Netzloff
(74) *Attorney, Agent, or Firm* — Cooper Legal Group LLC

(57) ABSTRACT

One or more computing devices, systems, and/or methods for mailbox-based coupon display are provided. For example, a plurality of email messages stored in a mailbox of a first email account of a first user may be identified, and may be evaluated to identify a plurality of coupons. The plurality of coupons may be analyzed to determine one or more coupon features. User data and/or activity data associated with the first user may be analyzed to determine one or more user features. A predictive model may be tuned based upon the one or more coupon features and/or the one or more user features. A set of scores may be generated for the plurality of coupons based upon the predictive model. A graphical user interface may be controlled based upon the set of scores to display one or more coupons.

20 Claims, 11 Drawing Sheets

(56) References Cited

U.S. PATENT DOCUMENTS

| | | | |
|---|---|---|---|
| 2013/0117098 A1* | 5/2013 | Madsen | G06Q 30/0202 |
| | | | 705/14.39 |
| 2013/0144674 A1* | 6/2013 | Kim | G06Q 30/0267 |
| | | | 705/7.19 |
| 2014/0006139 A1* | 1/2014 | Aggarwal | G06Q 30/0271 |
| | | | 705/14.41 |
| 2014/0136321 A1* | 5/2014 | Bolan | G06Q 30/0269 |
| | | | 705/14.71 |
| 2014/0229407 A1* | 8/2014 | White | G06N 20/00 |
| | | | 706/46 |
| 2015/0058136 A1* | 2/2015 | Jain | G06Q 30/0269 |
| | | | 705/14.66 |
| 2015/0100437 A1* | 4/2015 | Guo | G06Q 10/107 |
| | | | 705/14.73 |
| 2016/0127485 A1* | 5/2016 | Tseng | G06Q 30/0261 |
| | | | 709/205 |
| 2016/0132937 A1* | 5/2016 | Khoo | H04L 51/02 |
| | | | 705/14.66 |
| 2017/0032408 A1* | 2/2017 | Kumar | G06Q 30/0244 |
| 2017/0068982 A1* | 3/2017 | Vangala | G06Q 30/0224 |
| 2018/0018685 A1* | 1/2018 | Kahlow | G06Q 30/0246 |
| 2019/0303963 A1* | 10/2019 | Givol | G06K 9/00442 |
| 2020/0320561 A1* | 10/2020 | O'Brien | G06Q 30/0222 |

\* cited by examiner

METHOD AND SYSTEM FOR MAILBOX-BASED COUPON DISPLAY

BACKGROUND

Many providers of products and/or services may attempt to attract customers using computer-based communication mediums. For example, some providers may provide their products and/or services for sale via web-pages, while other providers may send messages, such as email messages, advertising their products and/or services to prospective customers. However, merely informing prospective customers of the availability of a product and/or service for purchase may not be sufficient to enable a given provider to reach desired levels of purchases. Accordingly, a provider may generate coupons for one or more products and/or services. For example, a coupon may enable a prospective customer to purchase a product and/or service associated with the coupon at a discount and/or with other favorable conditions that may not be available to another customer that lacks the coupon.

SUMMARY

In accordance with the present disclosure, one or more computing devices and/or methods are provided. In an example, a plurality of email messages stored in a mailbox of a first email account of a first user may be identified. The plurality of email messages may be evaluated to identify a plurality of coupons in the mailbox. The plurality of coupons may be analyzed to determine one or more coupon features associated with the plurality of coupons. User data associated with the first user and activity data associated with the first user may be analyzed to determine one or more user features associated with the first user. A predictive model for the first email account may be tuned based upon the one or more coupon features and the one or more user features. A set of scores may be generated for the plurality of coupons based upon the predictive model, wherein the set of scores comprises a score for each coupon of the plurality of coupons. A graphical user interface of a first client device may be controlled, based upon the set of scores of the plurality of coupons, to display one or more coupons of the plurality of coupons via an interface associated with the first email account.

In an example, a plurality of messages stored in association with a first messaging account of a first user may be identified. The plurality of messages may be evaluated to identify a plurality of coupons. The plurality of coupons may be analyzed to determine one or more coupon features associated with the plurality of coupons. At least one of user data associated with the first user or activity data associated with the first user may be analyzed to determine one or more user features associated with the first user. A predictive model for the first messaging account may be tuned based upon the one or more coupon features and the one or more user features. A set of scores may be generated for the plurality of coupons based upon the predictive model, wherein the set of scores comprises a score for each coupon of the plurality of coupons. A graphical user interface of a first client device may be controlled, based upon the set of scores of the plurality of coupons, to display one or more coupons of the plurality of coupons via an interface associated with the first messaging account.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
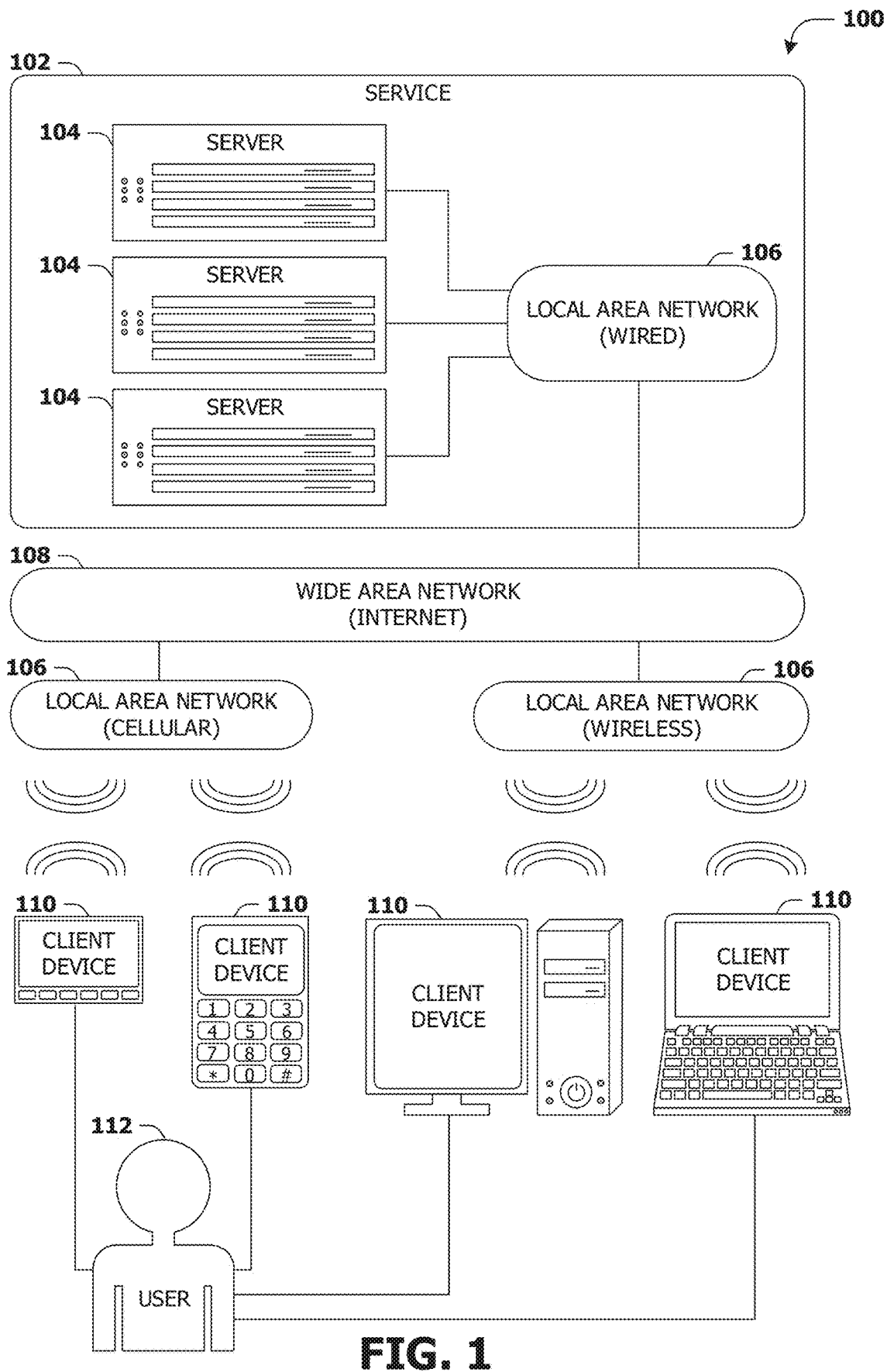
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
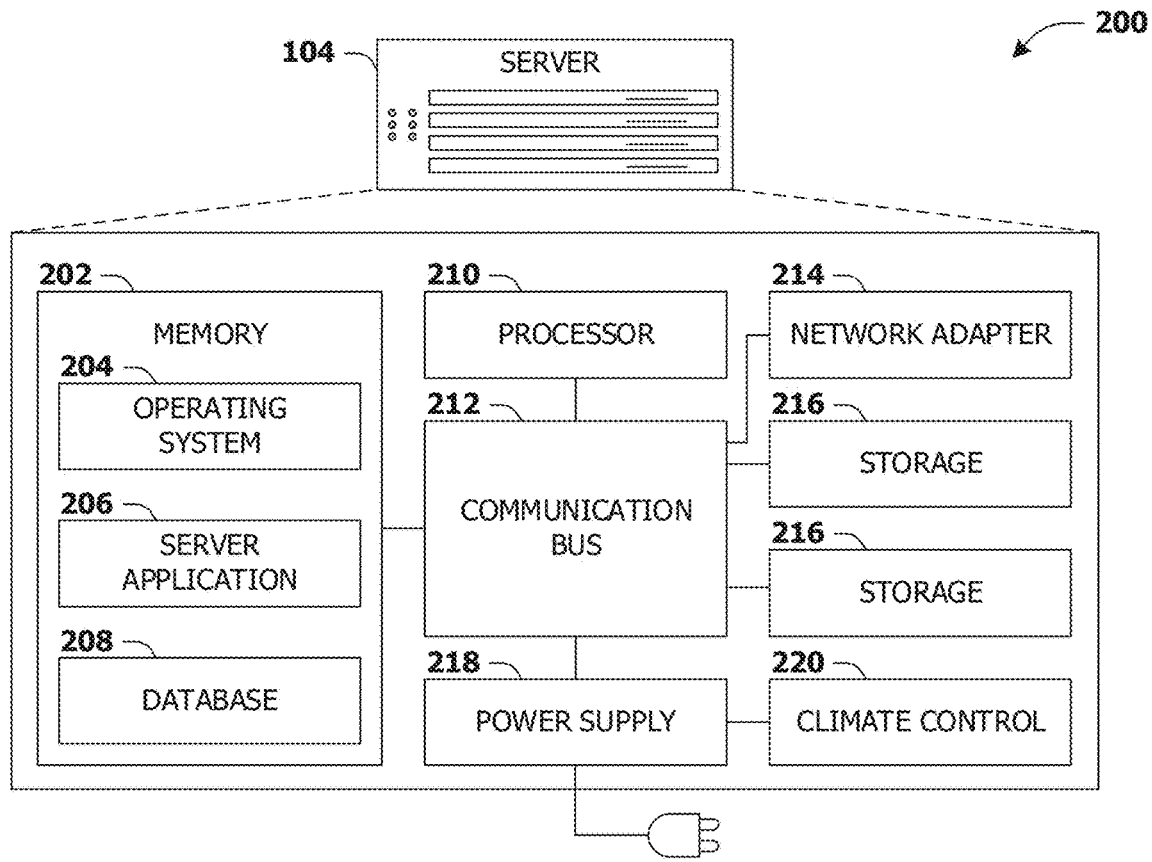
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
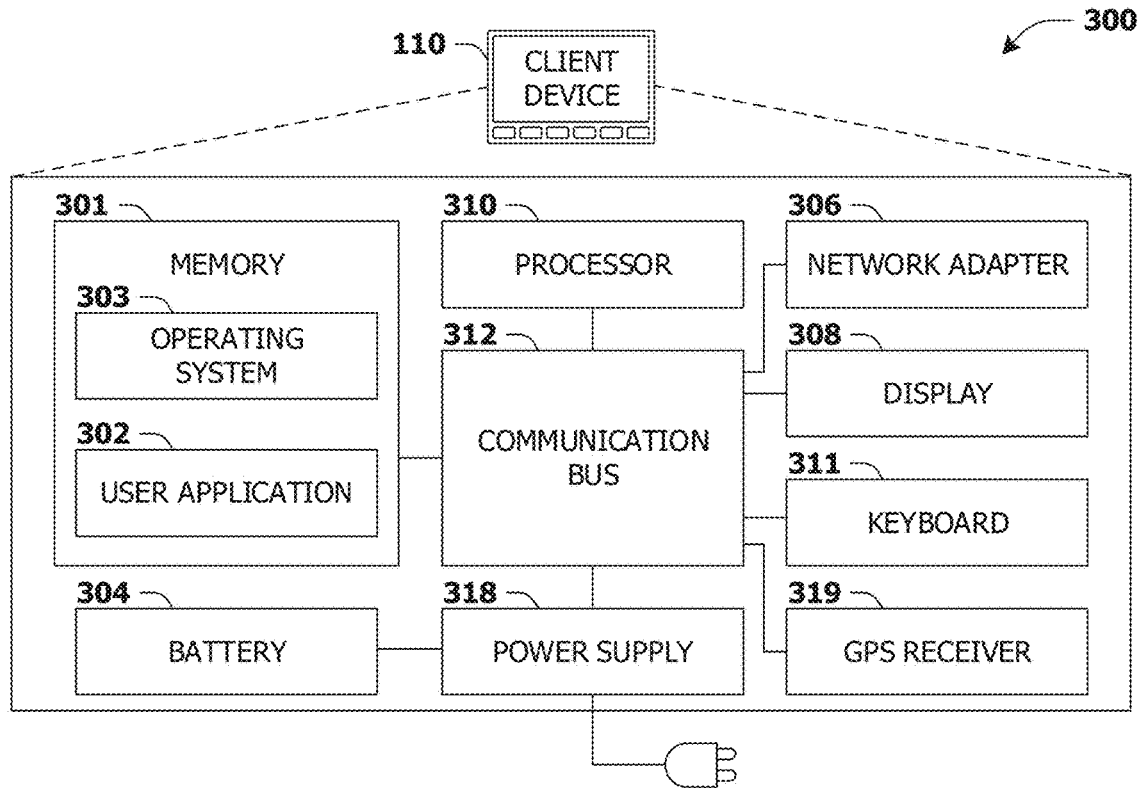
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for mailbox-based coupon display are provided. For example, a user may have a messaging account (e.g., such as an email account, an instant messaging account, a social network account, a phone call account, a fax account, a video call account, etc.). A plurality of messages (e.g., email messages, instant messages, social network messages/posts, (e.g., logs and/or transcripts of) phone calls, faxes, video calls, etc.), associated with the messaging account, may be received (e.g., by a server and/or a client device of the user). The plurality of messages may comprise a plurality of coupons. Each coupon may be usable to apply a discount and/or other condition (e.g., free shipping, gift, upgrade, accessory, etc.) for one or more purchases and/or transactions. The user may want to view and/or interact with (e.g., apply to a purchase, share, etc.) one or more coupons in the plurality of messages via one or more interfaces on the client device (e.g., such as an email client, a browser, an app, or another interface on the client device).

Viewing (e.g., and/or reading) (e.g., each of) the plurality of messages (e.g., and/or information about the messages), determining which of the plurality of messages comprise coupons, and determining which coupons are relevant to the user may requiring selecting each message from a list/folder of messages, evaluating each message to identify a coupon, evaluating the identified coupon, returning to the list/folder of messages, and then proceeding to a next message, and thus may consume a significant amount of time and/or resources of the client device, as well as time and/or effort of the user. Additionally, a user may have more interest, use, ability, etc. to access some coupons rather than others in association with a context. For example, while a mailbox (e.g., inbox) of the user may be filled with dozens, hundreds or thousands of coupons, the user may desire to view, use and/or share coupons that are relevant to interests of the user and/or that are valid for a particular period of time and/or a particular location, but in conventional systems, the messages, including messages comprising coupons, may simply be presented based upon a date the messages are received. Thus, the coupons that may best suited for use and/or sharing by the user may be listed low in the mailbox of the user. Thus, over time, in conventional systems, the coupons that the user desires and/or is best situated to use with may not be visually accessible, and the client device may be required to use an excessive amount of hardware resources (e.g., processor power) to retrieve the coupon, such as processing input for a search for the message comprising the coupon, scanning a database of messages, identifying the message as matching the search, evaluating the message for information about the coupon, and presenting the coupon for further interaction. Alternatively and/or additionally, resources of the client device may be occupied with presenting the user with other coupons/messages/functions, and the client device may thus cause the user to lose and/or otherwise fail to interact with the coupon in conventional systems.

Thus, in accordance with one or more of the techniques presented herein, user features associated with the user and/or coupon features associated with coupons in the mailbox of the user may be used to generate and/or tune a predictive model for the messaging account of the user, which may be used to generate scores for the coupons in the mailbox of the user, and a graphical user interface may be controlled to display one or more of the coupons based upon the set of scores. For example, the graphical user interface may be controlled in a manner that distinguishes the coupons (and/or messages comprising the coupons) that the user intends and/or is best and/or better suited to interact with (e.g., apply to a purchase, share, etc.), in a particular context (e.g., a current time and/or current location) associated with the user, from one or more other messages and/or coupons. Thus, in accordance with one or more of the techniques presented herein, the desired interactions may be performed with greater speed (e.g., as the client device graphically presents the coupons associated with the desired interactions in an accessible manner at a desirable time) and improved accuracy (e.g., as the client device decreases the probability of the desired interactions with messages being missed). Accordingly, the controlling of the graphical user interface (e.g., and/or one or more other actions) described herein improves the speed, accuracy and usability of computer displays and/or computer devices.

Figure 4:
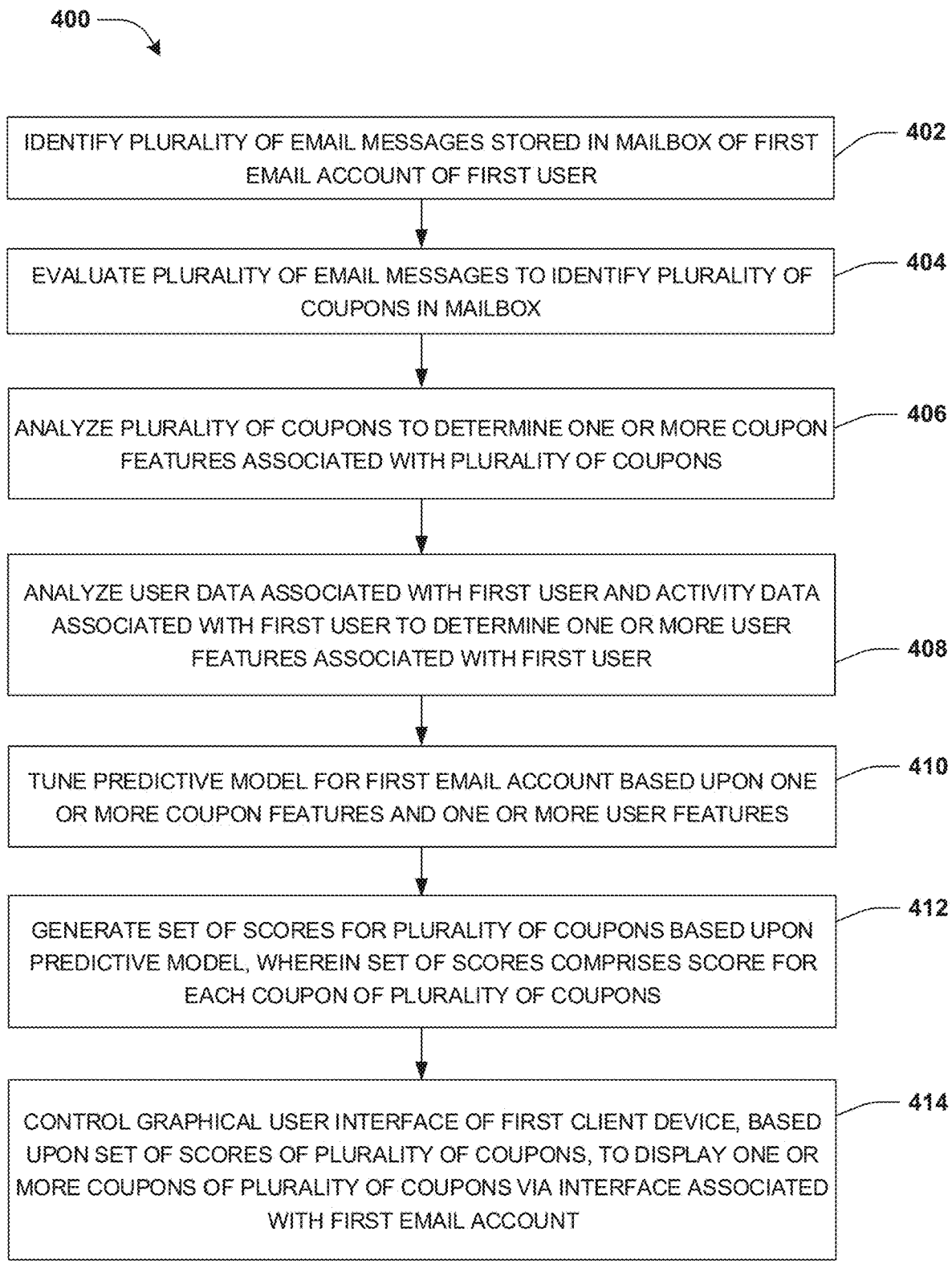
FIG. 4 is a flow chart illustrating an example method for mailbox-based coupon display.
Figure 5:
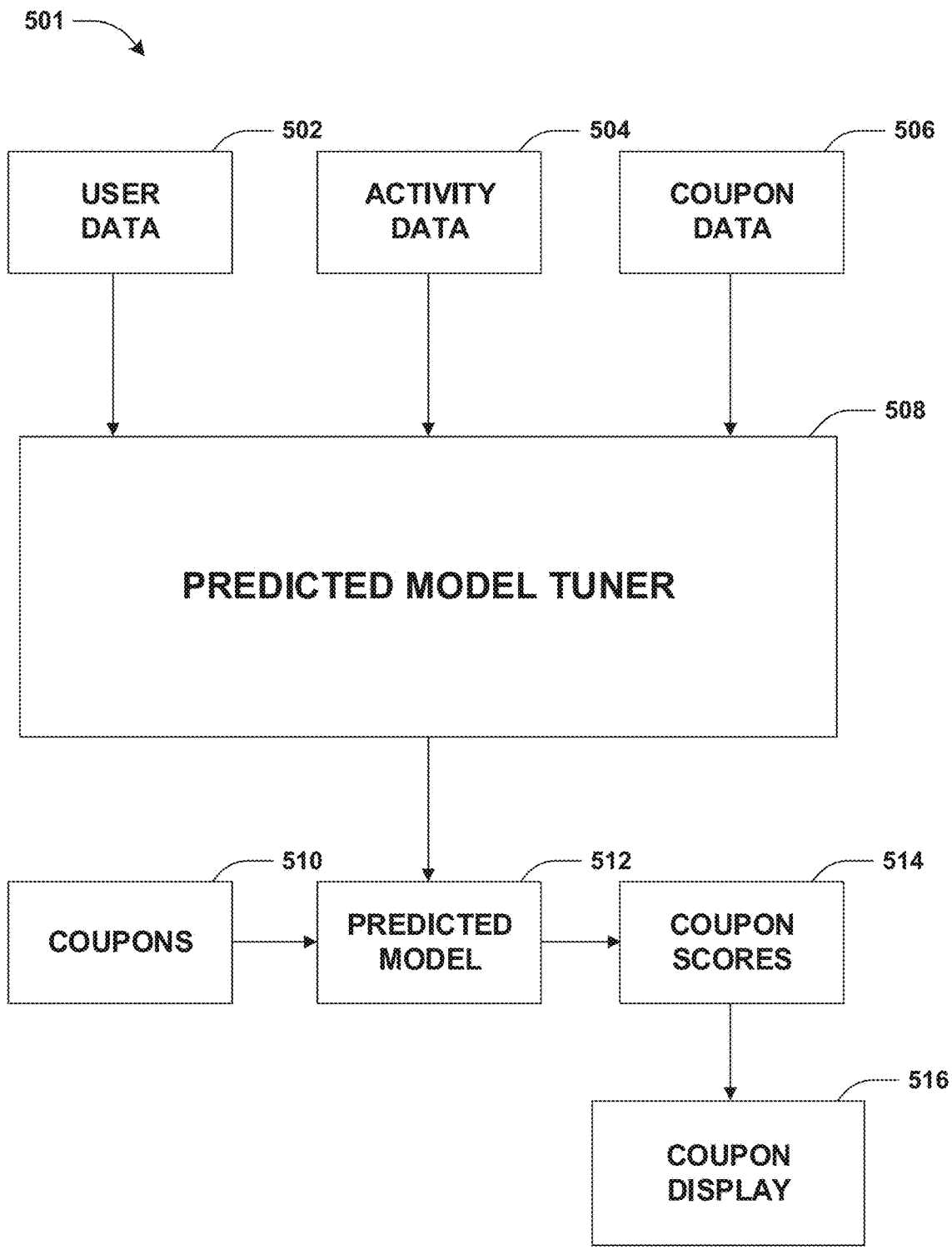
FIG. 5 is a component block diagram illustrating an example system for mailbox-based coupon display.

An embodiment of mailbox-based coupon display is illustrated by an example method 400 of FIG. 4 and/or an example system 501 of FIG. 5. In some examples, the messaging account may comprise an email account. A user, such as user Jill, (e.g., and/or a client device) may access and/or interact with a service for sending and receiving messages, such as an email service, an instant messaging service, a social network, an app, etc. The messaging account of the user with the service may be accessed and/or interacted with via one or more interfaces on the client device, such as an email client, a browser, an app, or another interface on the client device.

Accordingly, at 402, a plurality of messages stored in association with the messaging account may be identified (e.g., by a server and/or the client device) (e.g., via an email client, via a browser, via an app, via a social network, via an instant messaging service, via a phone call service, via a video call service, via a fax service, etc.). The plurality of messages may be stored in one or more mailboxes (e.g., databases) for the messaging account, such as a first database for an inbox (e.g., and/or log of incoming communications) of the messaging account, a second database for a sent box (e.g., and/or log of outgoing communications) of the messaging account, etc.

It may be appreciated that the plurality of messages in the mailbox of the user may include tens, hundreds, thousands and/or millions of messages. The plurality of messages may include messages received by the user (e.g., messages received from one or more other email accounts), messages sent by the user (e.g., messages sent to one or more other email accounts), and/or messages (at least partially) drafted by the user but not yet sent to intended recipients (e.g., messages in an outbox, in a drafts box, etc.). One or more messages of the plurality of messages may include messages received from and/or sent to contacts of the user, such as friends, family, colleagues, associates, etc. Such messages may, for example, include personal content that may not include advertising material. Alternatively and/or additionally, one or more of such messages may include shared and/or recommended content, such as a shared advertisement and/or shared coupon. In some examples, one or more messages of the plurality of messages may include messages received from and/or sent to providers, such as businesses providing one or more products and/or services for sale, rent, lease, etc. Such messages may include one or more advertisements and/or one or more coupons associated with one or more products and/or services.

At 404, the plurality of messages may be evaluated to identify a plurality of coupons in the mailbox. For example, each message of the plurality of messages may be evaluated to determine whether the message comprises one or more coupons. Various techniques may be used to make such a determination. In some examples, a search for a keyword (e.g., coupon, discount, save, % off, free shipping, etc.) may be performed on the mailbox, and one or more messages may be determined to comprise coupons based upon a determination that the one or more messages comprise content matching the keyword. Alternatively and/or additionally, the mailbox may be scanned using information, about known coupons, retrieved from one or more coupon databases (e.g., external databases). The one or more coupon databases may comprise identifying information (e.g., identifiers, text, colors, animations, timestamp, header information, associated email addresses, etc.) about one or more coupons issued by one or more providers. By using the information retrieved from the one or more coupon databases, coupons in the mailbox may be more quickly and/or accurately identified (e.g., even if one or more of the coupons do not match keywords generally associated with coupons).

At 406, the plurality of coupons in the mailbox, which may be at least part of coupon data 506 (illustrated in FIG. 5), may be analyzed to determine one or more coupon features associated with the plurality of coupons. For example, coupon features may be extracted from each coupon of the plurality of coupons. In some examples, one or more coupon features of a coupon may include information about a product and/or service associated with the coupon, a provider (e.g., merchant, seller, etc.) associated with the coupon (e.g., a first provider offering and/or honoring the coupon, a second provider competing with the first provider and/or selling similar products and/or services, etc.), and/or a deal associated with the coupon. The information about the product and/or service associated with the coupon may include a type of the product and/or service (e.g., headphones, contract drafting service, etc.), a category of the product and/or service (e.g., electronics, legal services, etc.), a brand of the product and/or service, a price of the product and/or service, and/or a seasonality of the product and/or service (e.g., Christmas, July 4, etc.). The information about the provider associated with the coupon may include a name of the provider, a type of the provider (e.g., retailer, contractor, office, etc.), and/or a location (e.g., geographical location) of the provider (e.g., Chicago, Los Angeles, etc.). The information about the deal associated with the coupon may include a discount type of the deal (e.g., discount on purchase, free gift, free shipping, etc.), a discount amount of the deal (e.g., 20% off, $10 off, etc.), an expiration date of the deal (e.g., Dec. 31, 2018), an indication of whether the deal is personal (e.g., generated for one or more specific users) or general (e.g., available to the public), and/or a popularity of the deal (e.g., 20% of recipients used the deal, 60% of recent purchases involved the deal, etc.). In some examples, at least some of the coupons of the one or more coupon databases may also be analyzed to determine at least some of the one or more coupon features (e.g., at least some of the coupons of the one or more coupon databases may also be analyzed to determine one or more supplemental coupon features).

At 408, user data 502 (illustrated in FIG. 5) associated with the user and/or activity data 504 (illustrated in FIG. 5) associated with the user may be analyzed to determine one or more user features associated with the user. For example, the user data 502 associated with the user may be retrieved from a user profile of the user, and may include a name, gender, age information, location, income and/or other demographic information associated with the user. In some examples, the user profile of the user may be a part of the messaging account of the user. Alternatively and/or additionally, the user profile may be a part of an associated service with which the user is registered (e.g., a social network, a search engine profile, a blogging profile, etc.). The associated service may be linked with the messaging account (e.g., by a common login), and/or may be identified based upon a determination that the user accesses the messaging account and/or the associated service on a common device.

The activity data 504 associated with the user may be retrieved from the user profile of the user and/or may be generated based upon data (e.g., receipts) extracted from the mailbox of the user. For example, the activity data 504 associated with the user may include information about shopping activity of the user, coupon usage of the user and/or mail usage of the user. The information about shopping activity of the user may include a frequency of shopping activity of the user (e.g., weekly, monthly, yearly, etc.), a periodicity of the shopping activity of the user (e.g., every holiday, every season, every birthday of one or more associates, etc.), a sum of the shopping activity of the user (e.g., the user spent $150 in a month, $1,000 in a year and/or a total of $8,400) and/or a category of the shopping activity of the user (e.g., electronics, food, etc.). The information about coupon usage of the user may include a distribution of coupon usage for one or more products (e.g., headphones) and/or one or more categories (e.g., electronics), and/or a recency (e.g., within the past week, past month, past year, etc.) of coupon usage for the one or more products and/or one or more categories. The information about mail usage of the user may include overall activity of the user in association with the messaging account (e.g., content sent, content received, responses, forwarding, deleting, marking as spam, labeling, clicking on content of a message body of a message, etc.), and/or may include a distribution over domains (e.g., first activity associated with firstdomain.com, second activity associated with seconddomain.org, etc.).

In some examples, the activity data 504 associated with the user may comprise contextual features from one or more online sessions of the user (e.g., a current session, a recent session, sessions that occurred within a threshold period of time, etc.). Contextual features may include attributes of one or more messages associated with (e.g., interacted with during) the one or more online sessions, such as a topic (e.g., travel, purchase, finance, etc.), a sender, a product and/or a service associated with each message. Alternatively and/or additionally, contextual features may include attributes of one or more coupons associated with (e.g., interacted with during) the one or more online sessions, such as a topic (e.g., travel, purchase, finance, etc.), a sender, a product and/or a service associated with each coupon.

Alternatively and/or additionally, contextual features may include attributes of one or more searches associated with (e.g., performed during) the one or more online sessions, such as a topic (e.g., travel, purchase, finance, etc.), a keyword, a product and/or a service associated with each search (e.g., products and/or services in search results for the search). Alternatively and/or additionally, contextual features may include attributes of one or more actions associated with (e.g., performed during) the one or more online sessions, such as composing a message, deleting a message, reading a message, forwarding a message, and/or replying to a message. Alternatively and/or additionally, contextual features may include geo-temporal attributes of the one or more online sessions, such as a time of day (e.g., 8 am, afternoon, etc.), a current location (e.g., geographical coordinates of the device of the user), and/or nearby stores (e.g., Famous Coffee Shop within 1 mile, Great Sandwich Shop within 1 block, etc.).

At 410, a predictive model 512 (illustrated in FIG. 5) for the messaging account of the user may be tuned and/or generated, by a predictive model tuner 508 (illustrated in FIG. 5), based upon the one or more coupon features determined by analyzing the plurality of coupons and/or at least some of the coupons of the one or more coupon databases and/or based upon the one or more user features determined by analyzing the user data and/or the activity data associated with the user. The predictive model 512 may be a machine-learned model. For example, the predictive model 512 may indicate that a first set of coupon features is associated with a first set of user features (e.g., a first subset of user data and/or a second subset of activity data), a second set of coupon features is associated with a second set of user features (e.g., a third subset of user data and/or a fourth subset of activity data), etc. Accordingly, the predictive model 512 may be configured to predict coupon interaction behavior of the user of the messaging account.

In some examples, one or more supplemental coupons may be retrieved from at least one of the one or more coupon databases. The supplemental coupons may not, for example, be retrieved from the mailbox of the messaging account (e.g., at least one of the coupon databases may be stored on a server different than one or more servers hosting the mailbox). The supplemental coupons may be analyzed to determine one or more supplemental user features associated with the user. Alternatively and/or additionally, supplemental coupon activity data associated with the user may be analyzed to determine the one or more supplemental user features associated with the user. The supplemental coupon activity data may be indicative of one or more actions (e.g., clicks, views, purchases, etc.) performed by the user (and/or a second user or a second set of users determined to be similar to the user) in association with the supplemental coupons. The one or more supplemental user features may be used to tune the predictive model 512. In some examples, "supplemental" in the term "supplemental coupons" may (merely) be used as a label to indicate a source from which the (supplemental) coupons are retrieved. For example, a difference between supplemental coupons and other coupons (e.g., coupons that are not labeled supplemental) may (merely) be their respective sources; while supplemental coupons may be retrieved from coupon databases rather than mailboxes (from which other coupons may be retrieved), supplemental coupons may otherwise be similar to other coupons in one or more respects such as format, structure and/or content. In some examples, supplemental coupons may be processed in a similar and/or same manner as other coupons, such as via method 400.

At 412, the predictive model 512 may be used to generate a set of scores 514 (illustrated in FIG. 5) for the plurality of coupons identified in the mailbox. For example, a score may be generated, for each coupon of the plurality of coupons, using the predictive model. Alternatively and/or additionally, the predictive model 512 may be used to generate a supplemental set of scores for at least some coupons of the one or more coupon databases (e.g., the supplemental coupons). The score of each coupon may be indicative of the relevance of the coupon to the user and/or a probability of the user interacting with (e.g., viewing, selecting, copying, sharing, highlighting, using) the coupon. It may be appreciated that the score for each coupon may be specific to a certain time, location, and/or other condition of the user; accordingly, updated scores may be generated for each coupon when the time, location and/or other condition of the user changes.

In some examples, the evaluating the plurality of email messages may comprise determining that a first message of the plurality of messages comprises a first coupon for a first provider. The analyzing the activity data associated with the user may comprise analyzing the first coupon to determine that first activity (e.g., viewing, selecting, copying, sharing, using, etc.) was performed by the first user in association with the first coupon. The generating the set of scores may comprise generating, based upon the first activity (e.g., clicking) performed by the first user in association with the first coupon (e.g., discount on headphones) for the first provider (e.g., an electronics retailer), a second score for a second coupon (e.g., discount on lettuce) for a second provider (e.g., a grocery store).

In some examples, the evaluating the plurality of messages may comprise determining that a first message of the plurality of messages comprises a first receipt of a first transaction (e.g., a purchase of a cell phone) with a first provider (e.g., an online reseller). The analyzing the activity data associated with the user may comprise analyzing the first receipt to determine that first activity (e.g., the purchase of the cell phone) was performed by the user. The generating the set of scores may comprise generating, based upon the first activity (e.g., the purchase of the cell phone via the first transaction) performed by the user, a second score for a second coupon (e.g., for a cell phone charger) for a second provider (e.g., a cell phone manufacturer).

At 414, a graphical user interface of a client device of the user may be controlled, based upon the set of scores of the plurality of coupons of the mailbox and/or the supplemental set of scores of the supplemental coupons, to display 516 (illustrated in FIG. 5) one or more coupons of the plurality of coupons and/or the supplemental coupons via an interface (e.g., an email interface, a web-page interface, an app interface, etc.) associated with the messaging account. For example, the one or more coupons of the plurality of coupons and/or the supplemental coupons may be selected from amongst the plurality of coupons and/or the supplemental coupons based upon scores of the one or more coupons. For example, the one or more coupons may be selected in response to a determination that the scores of the one or more coupons exceed a threshold score (e.g., while scores of one or more other (non-selected) coupons of the plurality of coupons and/or the supplemental coupons do not exceed the threshold score).

In some examples, the plurality of coupons (and/or the supplemental coupons) may be ranked based upon the set of scores. For example, a first rank may be assigned to a first coupon that has a highest score, a last rank may be assigned to a second coupon that has a lowest score, and/or a middle rank between the first rank and the last rank may be assigned to a third coupon with a middle score between the highest score and the lowest score. A target set of coupons may be selected from amongst the plurality of coupons (and/or the supplemental coupons) based upon a determination that each coupon of the target set of coupons has a rank that exceeds a rank threshold. The target set of coupons may comprise the one or more coupons selected for display via the interface. In some examples, the one or more coupons may be selected in response to a determination that the scores of the one or more coupons are the top-k scores among the scores of the plurality of coupons and/or the supplemental coupons (e.g., while scores of one or more other (non-selected) coupons of the plurality of coupons and/or the supplemental coupons are not among the top-k scores).

In some examples, the one or more coupons that are selected may be used to generate a message (e.g., an email message). For example, the message may comprise a representation (e.g., graphical, textual, link, etc.) of each coupon of the one or more coupons. The message may be provided to the messaging account. For example, the email message may be transmitted to the email account and/or stored in the mailbox of the email account. A first representation of the message displayed in a list of messages (e.g., inbox) of the messaging account may include a graphical and/or textual indication of the one or more coupons. For example, a label "coupons enclosed herein" may be displayed in the list of messages along with the subject of the message, the date of the message, and/or the sender of the message.

The user may select (e.g., click) on the first representation of the message, and in response, the interface may navigate away from the list of messages and/or may open a message interface (of an email interface) configured to display a message body of the message. The message body that is displayed may include a representation (e.g., graphical, textual, link, etc.) of each coupon of the one or more coupons. The sender of the message may be different than a provider associated with at least one coupon of the one or more coupons. A first coupon of the one or more coupons may be associated with a different provider, a different product and/or a different service than a second coupon of the one or more coupons.

In some examples, the one or more coupons that are selected may be used to generate a page of a mobile device application. The page may not comprise an email interface. For example, a first portion of the page of the mobile device application may be configured to display at least some of the one or more coupons. In some examples, a second portion of the page of the mobile device application may be configured to display other content, such as content items associated with news, weather, search functionality, etc. The page of the mobile device application may be transmitted to an instance of the mobile device application loaded (e.g., installed and/or running) on the client device of the user. For example, the user may be logged into the instance of the mobile device application on the client device and/or may have downloaded and/or installed the mobile device application on the client device. The client device may display the page comprising the first portion and/or the second portion via the instance of the mobile device application.

In some examples, the one or more coupons that are selected may be used to generate a web-page. The web-page may not comprise an email interface. For example, a first portion of the web-page may be configured to display at least some of the one or more coupons. In some examples, a second portion of the web-page may be configured to display other content, such as content items associated with news, weather, search functionality, etc. The web-page may be transmitted to the client device of the user. For example, the user may access an instance of the web-page via a web browser on the client device. The client device may display the web-page comprising the first portion and/or the second portion via the web browser.

In some examples, the one or more coupons that are selected (and/or the set of scores) may be used to control an advertisement system. The advertisement system may be configured to provide advertisements (e.g., from a plurality of providers) to a plurality of interfaces, including on one or more web-pages, search engine results pages, app interfaces, email interfaces and/or a third-party interface (e.g., a point of sale device). For example, the advertisement system may select the one or more coupons for transmission to one or more interfaces accessed by the user.

In some examples, the set of scores may be used to generate arrangement instructions for arranging a plurality of content items associated with one or more products. The arrangement instructions may be transmitted to a server of a second web-page, and may be used to arrange the plurality of content items with a defined arrangement and/or order. For example, the arrangement instructions may be used by an online retailer to arrange products on an instance of the second web-page of the online retailer that is accessed by the user. It may be appreciated that different arrangement instructions may be used by the (same) online retailer to arrange products on a second instance of the second web-page of the online retailer that is accessed by a second user.

FIGS. 6A-6F illustrate examples of a system 601 for mailbox-based coupon display. A first user, such as user Sam, and/or a first client device 600 associated with the first user may access and/or interact with a communication system for sending and/or receiving emails. For example, a first email account (and/or a different type of user account) of the first user with the communication system may be accessed and/or interacted with via a first email interface, such as an email client, a web email interface accessed via a browser, an email application, etc. on the first client device 600. In some examples, the communication system (and/or the first email interface) may be associated with an email service provider.

Figure 6A:
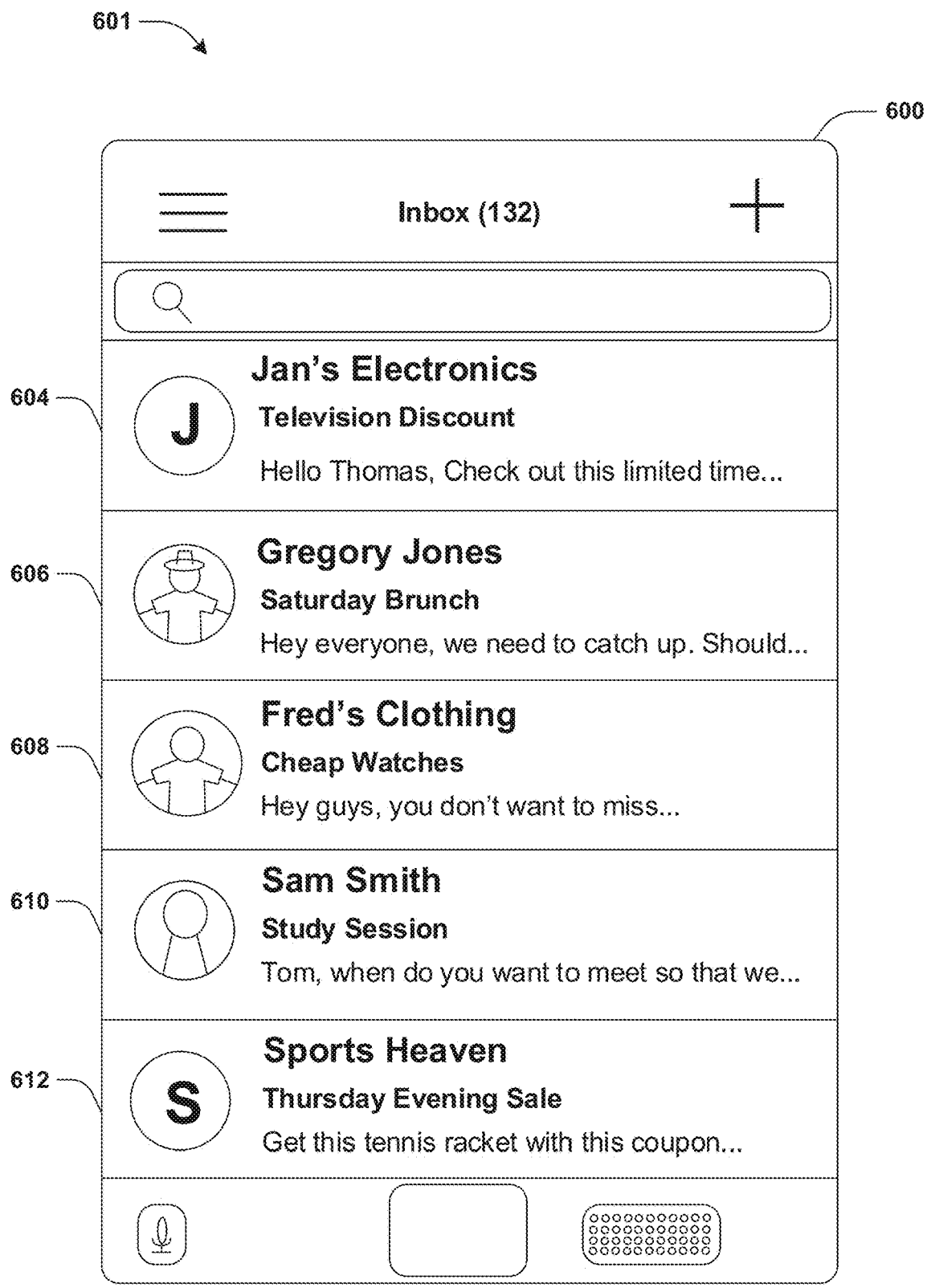
FIG. 6A is a component block diagram illustrating an example system for mailbox-based coupon display.

FIG. 6A illustrates a graphical user interface of the first client device 600 being controlled to display the first email interface. For example, the first email interface may comprise a list of emails. In some examples, a first email message 604, a second email message 606, a third email message 608, a fourth email message 610, and/or a fifth email message 612 received by the first email account may be identified. For example, the first email message 604 may be transmitted by and/or received from a second email account associated with a first provider (e.g., an electronics retailer), the second email message 606 may be transmitted by and/or received from a third email account associated with a first contact (e.g., a friend), the third email message 608 may be transmitted by and/or received from a fourth email account associated with a second provider (e.g., an online clothing store), the fourth email message 610 may be transmitted by and/or received from a fifth email account associated with a second contact (e.g., a classmate), and/or the fifth email message 612 may be transmitted by and/or received from a sixth email account associated with a third provider (e.g., a brick and mortar sporting goods store).

In some examples, the email messages of the first email account may be evaluated to identify one or more email messages that comprise coupons, including first email message 604, third email message 608, and/or fifth email message 612.

Figure 6B:
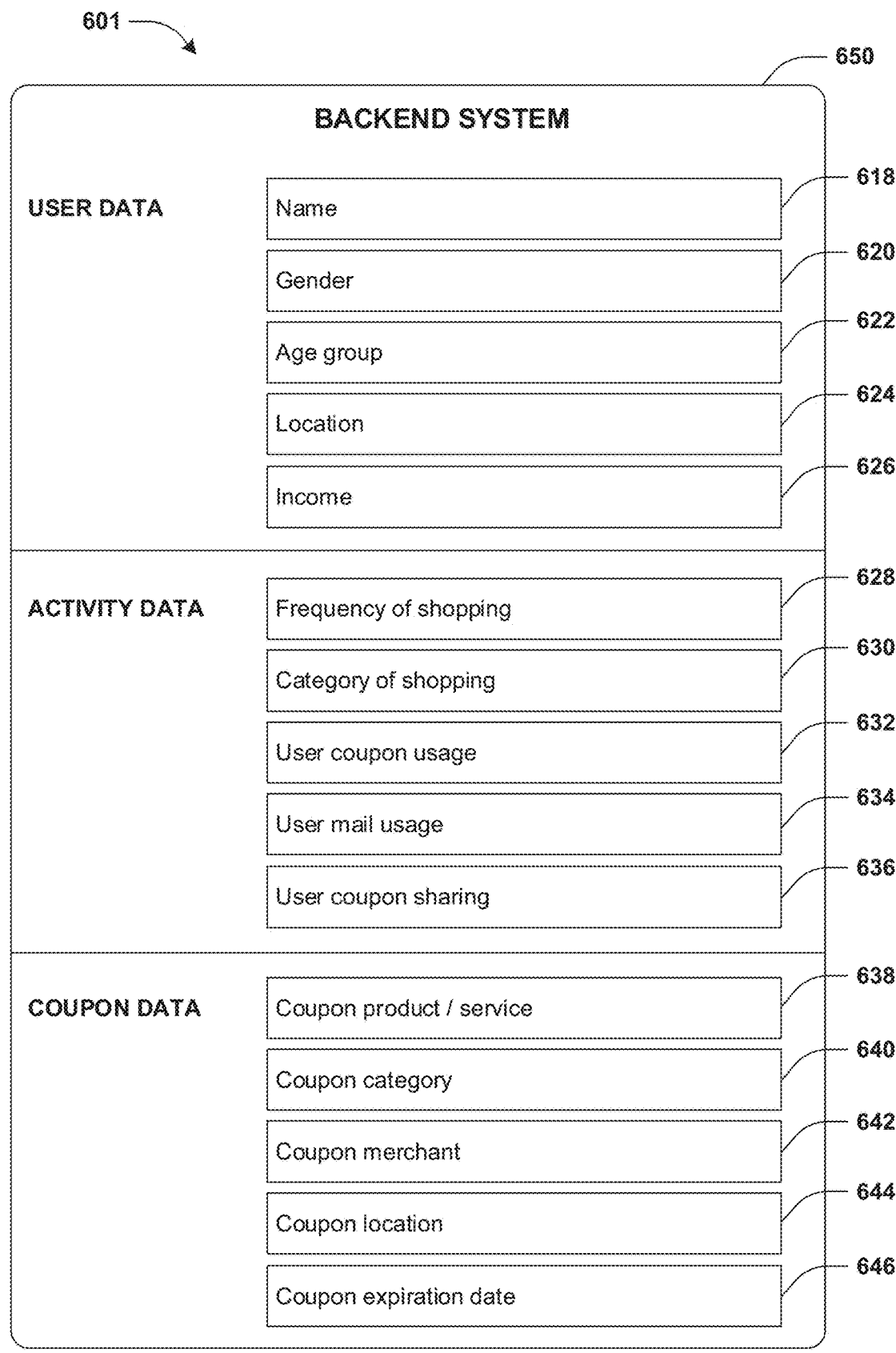
FIG. 6B is a component block diagram illustrating an example system for mailbox-based coupon display.

FIG. 6B illustrates a backend system 650 extracting user data, activity data and/or coupon data in association with the first user and/or the first email account of the first user. The user data, which may be extracted from one or more sources including one or more user profiles of the first user, may include, for example, a name 618, a gender 620, an age group 622, a location 624, and/or an income 626. The activity data, which may be extracted from one or more sources including one or more websites and/or online services used by the first user, may include, for example, a frequency of shopping 628, a category of shopping 630, a user coupon usage 632, a user mail usage 634, and/or a user coupon sharing 636. The coupon data, which may be extracted from one or more sources including the messages in the mailbox of the first user determined to comprise coupons, may include a coupon product and/or service 638, a coupon category 640, a coupon merchant 642, a coupon location 644 and/or a coupon expiration date 646.

In some examples, the coupons in the mailbox (and/or the coupon data) of the first user may be analyzed to determine one or more coupon features. In some examples, the user data and/or the activity data may be analyzed to determine one or more user features. A predictive model may be tuned (and/or generated) based upon the one or more coupon features and/or the one or more user features. The predictive model may be used to process the coupons in the mailbox and generate scores for one or more coupons in the mailbox.

Figure 6C:
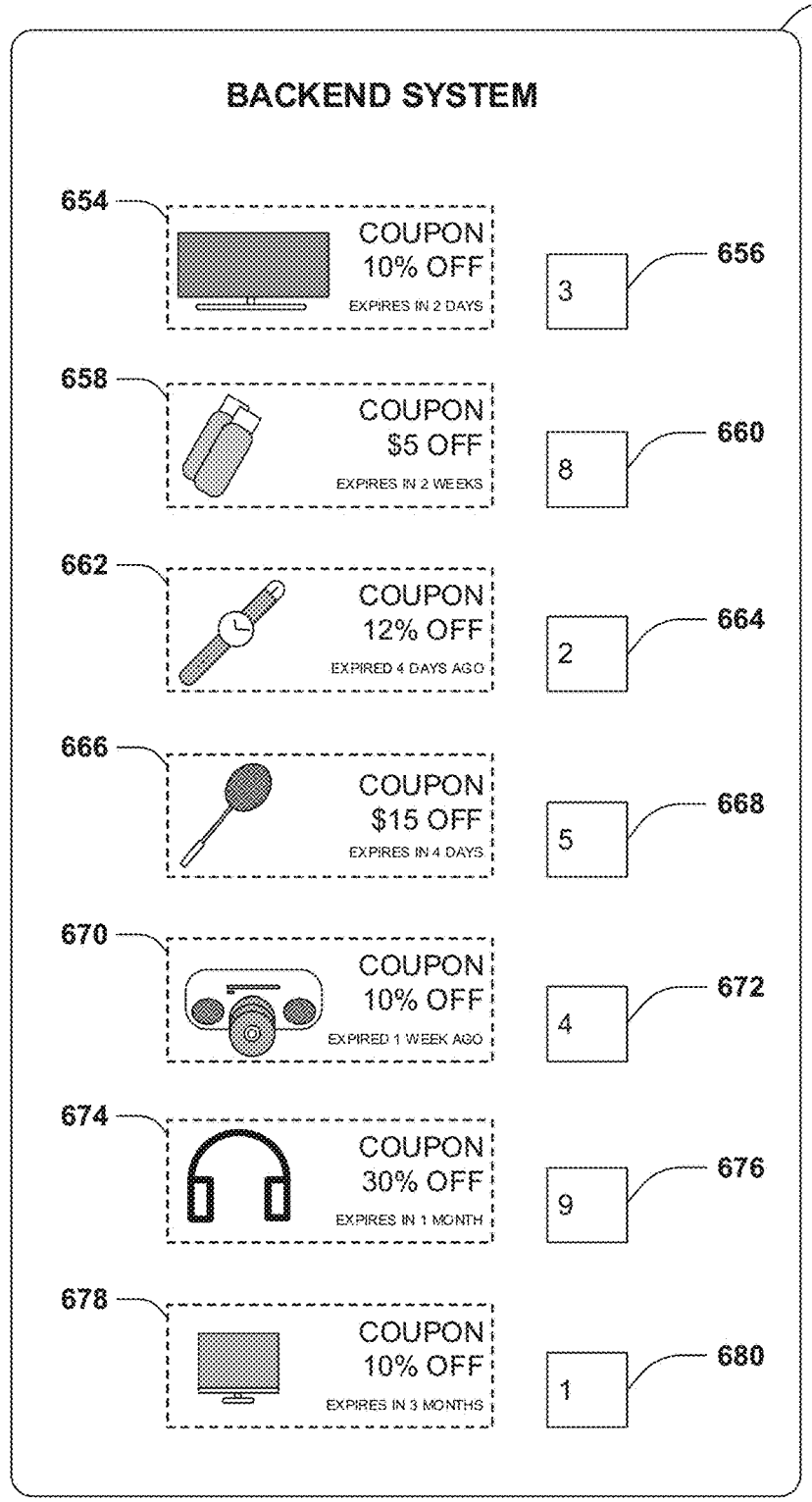
FIG. 6C is a component block diagram illustrating an example system for mailbox-based coupon display.

FIG. 6C illustrated the backend system generating a score for at least some of the coupons in the mailbox. A first coupon 654, which may have been extracted from first email message 604, may be assigned a first score 656. A second coupon 658 may be assigned a second score 660. A third coupon 662, which may have been extracted from third email message 608, may be assigned a third score 664. A fourth coupon 666, which may have been extracted from fifth email message 612, may be assigned a fourth score 668. A fifth coupon 670 may be assigned a fifth score 672. A sixth coupon 674 may be assigned a sixth score 676. A seventh coupon 678 may be assigned a seventh score 680.

Figure 6D:
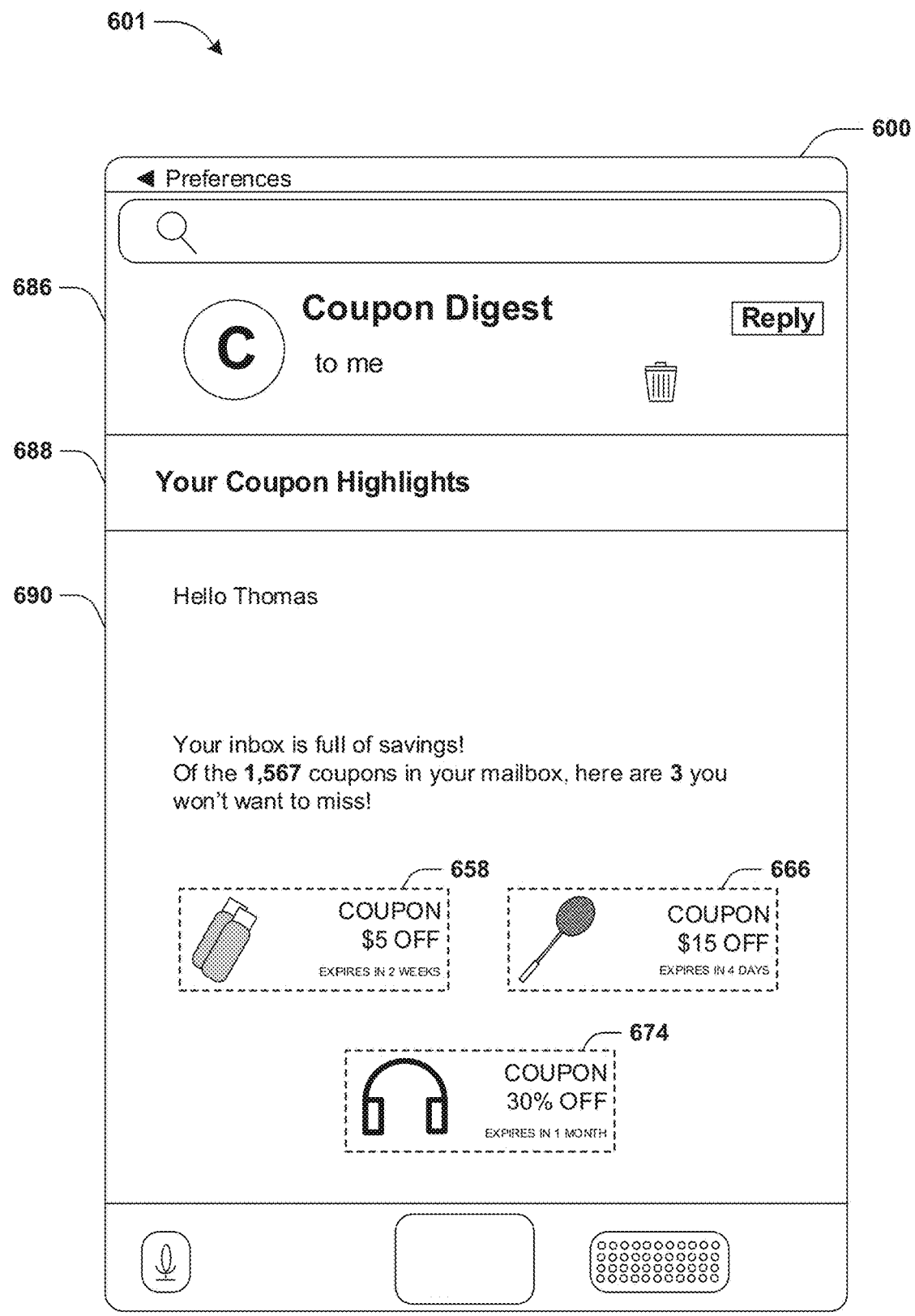
FIG. 6D is a component block diagram illustrating an example system for mailbox-based coupon display.

In some examples, the scores of the coupons in the mailbox may be used to generate a coupon email message. FIG. 6D illustrates the graphical user interface of the first client device 600 being controlled to display the coupon email message. The graphical user interface may include a first region 686 indicative of a sender of the coupon email message and/or an intended recipient of the coupon email message. Alternatively and/or additionally, the graphical user interface may include a second region 688 indicative of a subject of the coupon email message. Alternatively and/or additionally, the graphical user interface may include a third region 690 indicative of an email message body of the coupon email message. The email message body may include one or more coupons selected from the coupons of the mailbox of the first user based upon the scores of the coupons. For example, the second coupon 658, the fourth coupon 666 and/or the sixth coupon 674 may be included in the email message body based upon a determination that the second score 660, the fourth score 668 and/or the sixth score 676 meet a threshold score and/or are top-k scores.

Figure 6E:
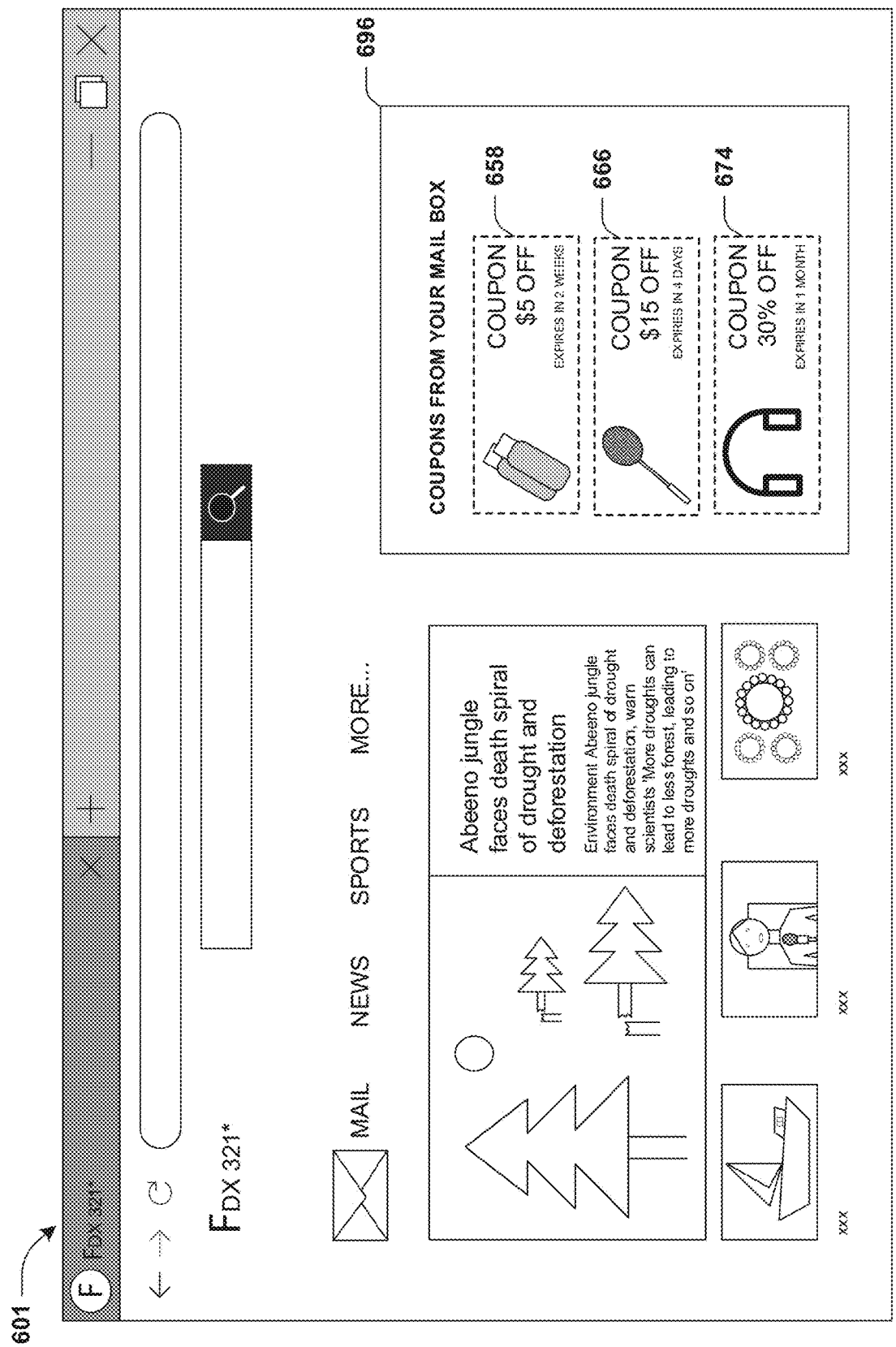
FIG. 6E is a component block diagram illustrating an example system for mailbox-based coupon display.

In some examples, the scores of the coupons in the mailbox may be used to generate a web-page. FIG. 6E illustrates the graphical user interface of the first client device 600 being controlled to display the web-page. The web-page may include a first region 696 including the one or more coupons selected from the coupons of the mailbox of the first user based upon the scores of the coupons. The web-page may, however, not be an email interface, and/or may comprise content linking to other websites, including news articles, and/or a search mechanism.

Figure 6F:
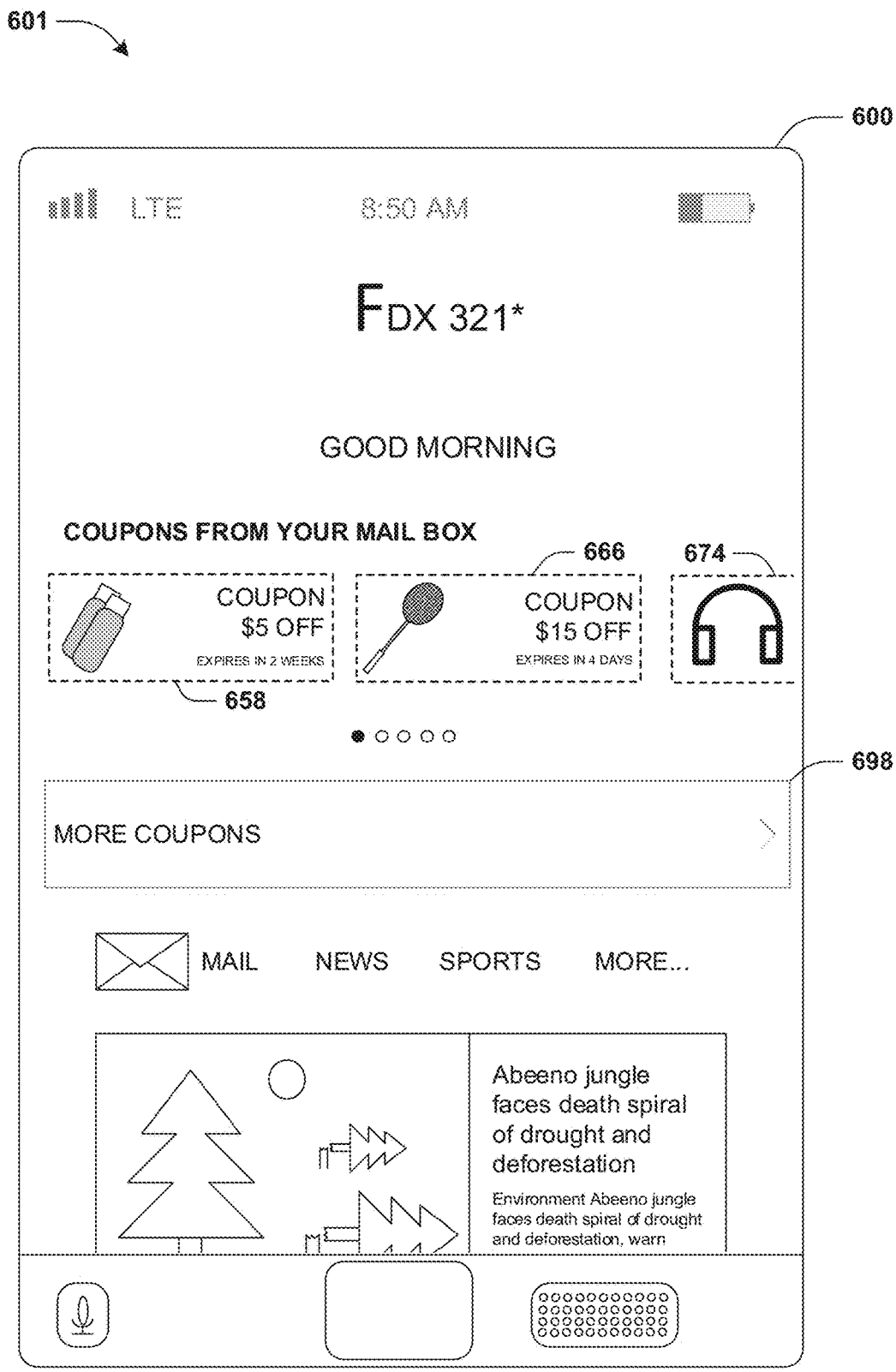
FIG. 6F is a component block diagram illustrating an example system for mailbox-based coupon display.

In some examples, the scores of the coupons in the mailbox may be used to generate a page of a mobile device application. FIG. 6F illustrates the graphical user interface of the first client device 600 being controlled to display the page of the mobile device application. The web-page may include the one or more coupons selected from the coupons of the mailbox of the first user based upon the scores of the coupons and/or an element 698 that, if selected, may provide the first user with access with other coupons (e.g., other coupons in the mailbox of the user and/or other coupons found online). The page of the mobile device application may, however, not be an email interface, and/or may comprise content linking to other websites, including news articles, and/or a search mechanism.

It may be appreciated that the disclosed subject matter may assist a user (e.g., and/or a client device associated with the user) in accessing coupons relevant to the user at different times, locations, and/or contexts without having to switch interfaces, manually explore a mailbox of the user, evaluate various messages, identify which messages have coupons, and/or identify which coupons are relevant to interests of the user and/or are valid.

In some examples, at least some of the disclosed subject matter may be implemented on a client device, and in some examples, at least some of the disclosed subject matter may be implemented on a server (e.g., hosting a service accessible via a network, such as the Internet).

Figure 7:
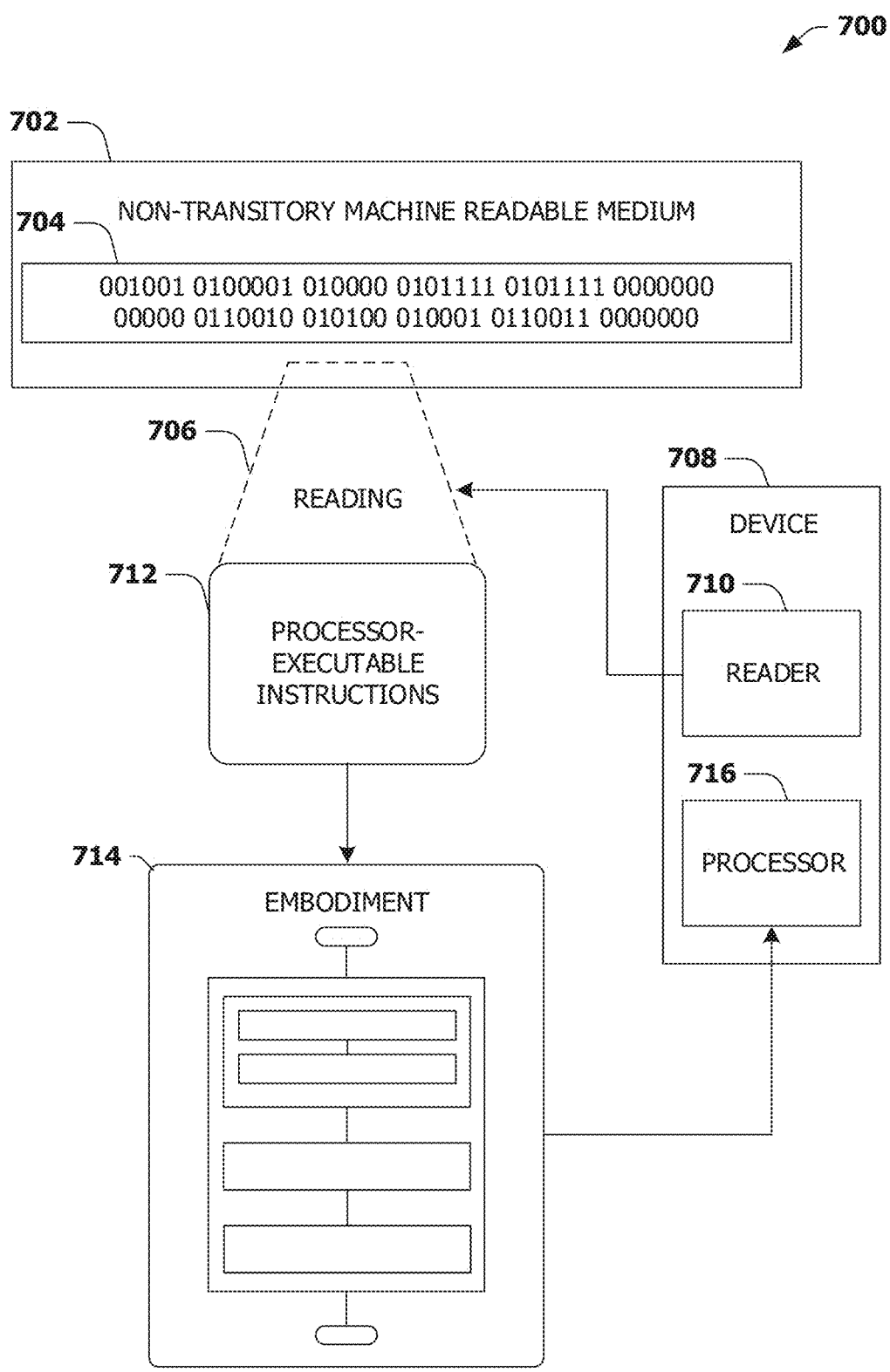
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein (e.g., embodiment 714). The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 400 of FIG. 4, for example. In some embodiments, the processor-executable instructions 712 are configured to cause implementation of a system, such as at least some of the example system 501 of FIG. 5, and/or the example system 601 of FIGS. 6A-6F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:

identifying a plurality of email messages stored in a mailbox of a first email account of a first user;

evaluating the plurality of email messages to identify a plurality of coupons in the mailbox;

analyzing the plurality of coupons to determine one or more coupon features associated with the plurality of coupons;

analyzing user data associated with the first user and activity data associated with the first user to determine one or more user features associated with the first user;

tuning a predictive model for the first email account based upon the one or more coupon features and the one or more user features;

generating a set of scores for the plurality of coupons based upon the predictive model, wherein the set of scores comprises a score for each coupon of the plurality of coupons, wherein each score of the set of scores is indicative of at least one of a relevance of sharing a corresponding coupon by the first user in view of a condition of the first user or a probability of the first user sharing the corresponding coupon in view of the condition of the first user;

updating the set of scores for the plurality of coupons to generate an updated set of scores based upon the condition of the first user changing to a second condition, wherein each score of the updated set of scores is indicative of at least one of a relevance of sharing a corresponding coupon by the first user in view of the second condition of the first user or a probability of the first user sharing the corresponding coupon in view of the second condition of the first user;

generating a first selectable representation of a first coupon, identified in a first email message in the mailbox, based upon a first graphic of the first email message, first text of the first email message and a first link of the first email message;

generating a second selectable representation of a second coupon, identified in a second email message in the mailbox, based upon a second graphic of the second email message, second text of the second email message and a second link of the second email message, wherein the second coupon was shared with the first user by another user; and controlling a single graphical user interface, that is not an email interface, of a first client device, based upon the updated set of scores of the plurality of coupons, to display at least one of a web-page or a page of a mobile device application concurrently displaying, within the single graphical user interface that is not an email interface:

(i) a mailbox portion comprising selectable representations of coupons identified in the mailbox comprising the first selectable representation of the first coupon identified in the first email message and the second selectable representation of the second coupon identified in the second email message, wherein the first user is allowed to share one or more coupons identified in the mailbox with one or more other users; and (ii) a selectable element associated with other coupons identified in the mailbox, wherein selection of the selectable element causes the single graphical user interface that is not an email interface to display a third selectable representation of a third coupon identified in a third email message in the mailbox without a user of the first client device having to switch interfaces, wherein the third selectable representation of the third coupon was not displayed prior to selection of the selectable element.

2. The method of claim 1, comprising:

ranking the plurality of coupons based upon the set of scores; and selecting a target set of coupons, from amongst the plurality of coupons, associated with ranks exceeding a rank threshold, wherein the controlling the single graphical user interface of the first client device comprises displaying the target set of coupons.

3. The method of claim 1, comprising:

generating a coupon email message based upon one or more coupons; and transmitting the coupon email message to the first email account, wherein the coupon email message comprises an indication of a number of coupons stored in the mailbox of the first email account, the first selectable representation of the first coupon and the second selectable representation of the second coupon.

4. The method of claim 1, wherein the first selectable representation comprises a first indication of a first expiration time of the first coupon and the second selectable representation comprises a second indication of a second expiration time of the second coupon.

5. The method of claim 1, comprising:

generating a first portion of a first page of the mobile device application based upon one or more coupons; and transmitting the first portion of the first page of the mobile device application to an instance of the mobile device application loaded on the first client device of the first user, wherein the first client device is a mobile device and the controlling the single graphical user interface of the first client device to display the one or more coupons comprises displaying the one or more coupons in the first page of the mobile device application.

6. The method of claim 1, comprising:

generating a first portion of a first web-page based upon one or more coupons; and transmitting the first portion of the first web-page to a first device of the first user, wherein the controlling the single graphical user interface of the first client device to display the one or more coupons comprises displaying the one or more coupons in the first web-page.

7. The method of claim 1, comprising:
retrieving supplemental coupons from a coupon database, wherein the supplemental coupons are not stored in the mailbox;
analyzing at least one of the supplemental coupons to determine one or more supplemental coupon features;
tuning the predictive model based upon the one or more supplemental coupon features; and
generating a supplemental set of scores for the supplemental coupons based upon the predictive model,
wherein the controlling comprises controlling the single graphical user interface of the first client device, based upon the supplemental set of scores of the supplemental coupons, to display one or more coupons of the supplemental coupons.

8. The method of claim 1, comprising:
retrieving supplemental coupons from a coupon database, wherein the supplemental coupons are not stored in the mailbox;
analyzing at least one of the supplemental coupons or supplemental coupon activity data associated with the first user to determine one or more supplemental user features associated with the first user; and
tuning the predictive model based upon the one or more supplemental user features.

9. The method of claim 1, wherein:
the evaluating the plurality of email messages comprises determining that an email message of the plurality of email messages comprises a coupon for a first provider; and
the analyzing the activity data associated with the first user comprises analyzing the coupon to determine that first activity was performed by the first user in association with the coupon.

10. The method of claim 9, wherein:
the generating the set of scores comprises generating, based upon the first activity performed by the first user in association with the coupon, a second score for another coupon for a second provider.

11. The method of claim 1, wherein:
the evaluating the plurality of email messages comprises determining that an email message of the plurality of email messages comprises a first receipt of a first transaction with a first provider; and
the analyzing the activity data associated with the first user comprises analyzing the first receipt to determine that first activity was performed by the first user.

12. The method of claim 1, wherein the condition of the first user comprises a location of the first user and the second condition of the first user comprises a second location of the first user.

13. The method of claim 1, wherein the controlling the single graphical user interface that is not an email interface comprises distinguishing the first selectable representation of the first coupon and the second selectable representation of the second coupon from one or more representations of one or more other coupons in one or more other emails in the mailbox.

14. The method of claim 1, comprising:
retrieving identifying information about known coupons from one or more coupon databases, wherein the identifying information is indicative of at least one of one or more identifiers, one or more text, one or more colors, one or more animations, one or more timestamps, one or more header information or one or more email addresses associated with one or more coupons issued by one or more providers,
wherein the evaluating the plurality of email messages to identify the plurality of coupons is performed using the identifying information about known coupons.

15. A computing device comprising:
a processor; and
memory comprising processor-executable instructions that when executed by the processor cause performance of operations, the operations comprising:
identifying a plurality of email messages stored in a mailbox of a first email account of a first user;
evaluating the plurality of email messages to identify a plurality of coupons in the mailbox;
analyzing the plurality of coupons to determine one or more coupon features associated with the plurality of coupons;
analyzing at least one of user data associated with the first user or activity data associated with the first user to determine one or more user features associated with the first user;
tuning a predictive model for the first email account based upon the one or more coupon features and the one or more user features;
generating a set of scores for the plurality of coupons based upon the predictive model, wherein the set of scores comprises a score for each coupon of the plurality of coupons, wherein each score of the set of scores is indicative of a relevance of sharing a corresponding coupon the first user in view of a condition of the first user;
updating the set of scores for the plurality of coupons to generate an updated set of scores based upon the condition of the first user changing to a second condition, wherein each score of the updated set of scores is indicative of a relevance of sharing a corresponding coupon the first user in view of the second condition of the first user;
generating a first selectable representation of a first coupon, identified in a first email message in the mailbox, based upon at least one of a first graphic of the first email message, first text of the first email message or a first link of the first email message;
generating a second selectable representation of a second coupon, identified in a second email message in the mailbox, based upon at least one of a second graphic of the second email message, second text of the second email message or a second link of the second email message, wherein the second coupon was shared with the first user by another user; and
controlling a single graphical user interface, that is not an email interface, of a first client device, based upon the updated set of scores of the plurality of coupons, to display at least one of a web-page or a page of a mobile device application concurrently displaying, within the single graphical user interface that is not an email interface:
(i) a mailbox portion comprising selectable representations of coupons identified in the mailbox comprising the first selectable representation of the first coupon identified in the first email message and the second selectable representation of the second coupon identified in the second email message, wherein the first user is allowed to share one or more coupons identified in the mailbox with one or more other users; and
(ii) a selectable element associated with other coupons identified in the mailbox, wherein selection of the selectable element causes the single graphical user interface that is not an email interface to display a third selectable representation of a third coupon identified in a third email message in the mailbox without a user of the first client device having to switch interfaces, wherein the third selectable representation of the third coupon was not displayed prior to selection of the selectable element.

16. The computing device of claim 15, the operations comprising:
generating a coupon email message based upon one or more coupons; and
transmitting the coupon email message to the first email account, wherein the controlling the single graphical user interface of the first client device to display the one or more coupons comprises displaying the one or more coupons in a first message body of the coupon email message.

17. The computing device of claim 16, wherein:
the displaying the one or more coupons in the first message body of the coupon email message is performed responsive to receiving a selection of a representation of the coupon email message in a list of email messages of the mailbox.

18. A non-transitory machine readable medium having stored thereon processor-executable instructions that when executed cause performance of operations, the operations comprising:
identifying a plurality of messages stored in association with a first messaging account of a first user;
evaluating the plurality of messages to identify a plurality of coupons;
analyzing the plurality of coupons to determine one or more coupon features associated with the plurality of coupons;
analyzing at least one of user data associated with the first user or activity data associated with the first user to determine one or more user features associated with the first user;
tuning a predictive model for the first messaging account based upon the one or more coupon features and the one or more user features;
generating a set of scores for the plurality of coupons based upon the predictive model, wherein the set of scores comprises a score for each coupon of the plurality of coupons, wherein each score of the set of scores is indicative of a probability of the first user sharing a corresponding coupon in view of a condition of the first user;
updating the set of scores for the plurality of coupons to generate an updated set of scores based upon the condition of the first user changing to a second condition, wherein each score of the updated set of scores is indicative of a probability of the first user sharing the corresponding coupon in view of the second condition of the first user;
generating a first selectable representation of a first coupon identified in a first message stored in association with the first messaging account;
generating a second selectable representation of a second coupon identified in a second message stored in association with the first messaging account, wherein the second coupon was shared with the first user by another user; and
controlling a single graphical user interface, that is not an email interface, of a first client device, based upon the updated set of scores of the plurality of coupons, to display at least one of a web-page or a page of a mobile device application concurrently displaying, within the single graphical user interface that is not an email interface:
(i) a second portion comprising selectable representations of coupons, identified in messages stored in association with the first messaging account, comprising the first selectable representation of the first coupon identified in the first message and the second selectable representation of the second coupon identified in the second message, wherein the first user is allowed to share one or more coupons identified in association with the first messaging account with one or more other users; and
(ii) a selectable element associated with other coupons identified in association with the first messaging account, wherein selection of the selectable element causes the single graphical user interface that is not an email interface to display a third selectable representation of a third coupon identified in a third email message identified in association with the first messaging account without a user of the first client device having to switch interfaces, wherein the third selectable representation of the third coupon was not displayed prior to selection of the selectable element.

19. The non-transitory machine readable medium of claim 18, the operations comprising:
generating a first portion of a first page of the mobile device application based upon coupons; and
transmitting the first portion of the first page of the mobile device application to an instance of the mobile device application loaded on the first client device of the first user, wherein the first client device is a mobile device and the controlling the single graphical user interface of the first client device comprises displaying the coupons in the first page of the mobile device application.

20. The non-transitory machine readable medium of claim 18, the operations comprising:
generating a first portion of a first web-page based upon coupons; and
transmitting the first portion of the first web-page to a first device of the first user, wherein the controlling the single graphical user interface of the first client device comprises displaying the coupons in the first web-page.

* * * * *